No. 867,663. PATENTED OCT. 8, 1907.

G. H. KÖRNER.
FAUCET PROTECTOR.
APPLICATION FILED APR. 10, 1906.

WITNESSES:
Bruce Gorfinkel
Jesse P. Eoff

INVENTOR.
Geo. H. Körner
BY
F. M. Wright
ATTORNEY.

UNITED STATES PATENT OFFICE.

GEORGE H. KÖRNER, OF SAN FRANCISCO, CALIFORNIA.

FAUCET-PROTECTOR.

No. 867,663.      Specification of Letters Patent.      Patented Oct. 8, 1907.

Application filed April 10, 1906. Serial No. 310,919.

*To all whom it may concern:*

Be it known that I, GEORGE H. KÖRNER, a citizen of the United States, residing at San Francisco, in the county of San Francisco and State of California, have invented certain new and useful Improvements in Faucet-Protectors, of which the following is a specification.

The object of this invention is to provide means for preventing the stealing of whisky or other liquors from barrels.

A common method of stealing whisky by the employees in places where liquors are sold is to partly unscrew the faucet of the barrel so as to allow the liquor to drip out, and collecting the drippings to sell or otherwise dispose of the same. The present invention provides means for preventing this practice.

Figure 1:
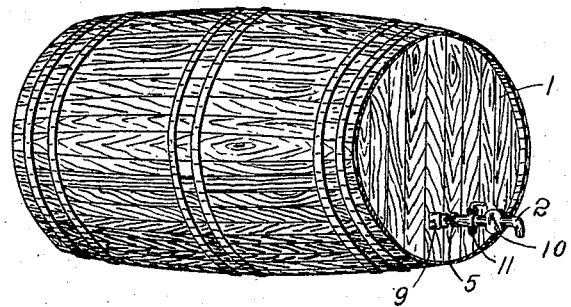
Figure 2:
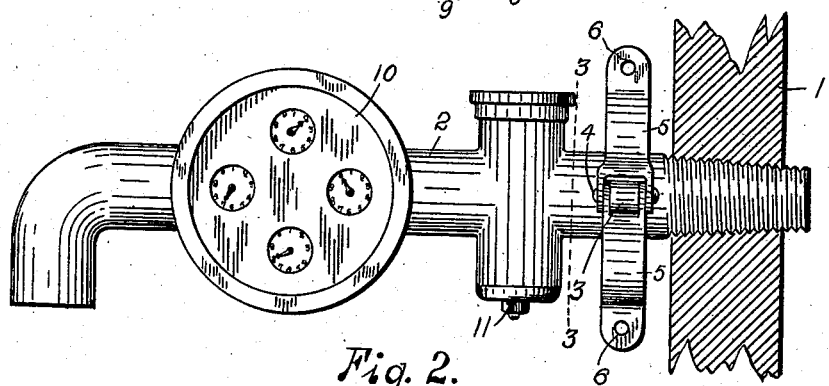
Figure 5:
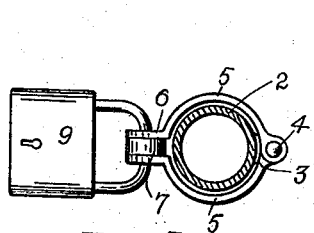
Figure 6:
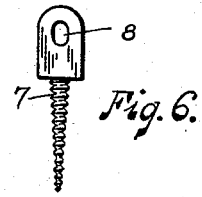
Figure 3:
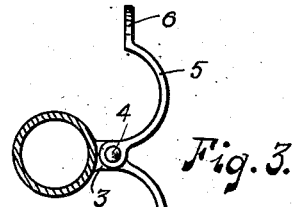
Figure 4:
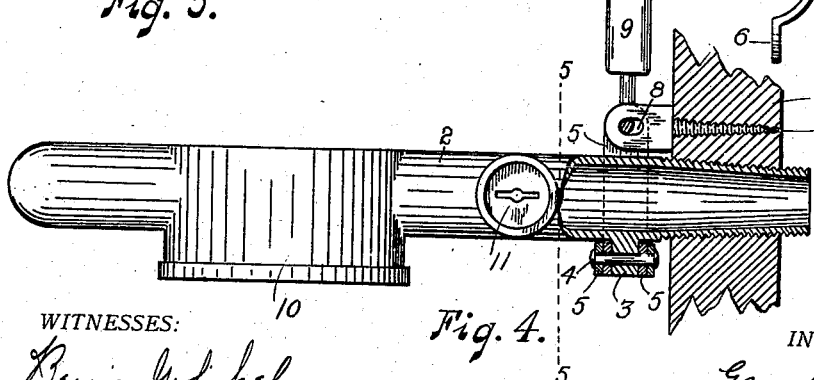

In the accompanying drawing Figure 1, is a perspective view of a barrel having a faucet equipped with my invention; Fig. 2 is a side view of the faucet, showing the protecting device open; Fig. 3 is a cross section on the line 3—3 of Fig. 2; Fig. 4 is a horizontal section through the faucet, showing the device closed; Fig. 5 is a cross section on the line 5—5 of Fig. 4; Fig. 6 is a side view of the screw used in the invention.

Referring to the drawing, 1 represents a barrel into which is screwed a faucet 2. Upon the side of the faucet is formed a lug 3, upon which are pivoted, as shown at 4, clamp members 5 adapted to encircle the faucet and terminating in apertured ends 6. When the clamp members are closed around the faucet said ends lie on each side of the head of a screw 7, which head has an aperture 8 adapted to aline with the apertures in the ends of the clamp members. The screw having been screwed into the barrel at the side of the faucet, and said apertures having been brought into alinement the shackle of a padlock 9 is passed through said apertures, and the padlock is then locked.

It will be readily seen that neither the faucet nor the screw can be turned or unscrewed from the barrel, and thus the stealing of liquor by the above practice is entirely prevented.

As an additional improvement I provide in the faucet a liquid meter 10 which measures the amount drawn off. The valve 11 for opening the faucet is of the type actuated by means of a key.

I claim:—

1. In a combination with a faucet constructed to be screwed into a barrel, a device also constructed to be screwed into a barrel at the side of the faucet, one of said elements the faucet and device having an aperture, a connection pivoted to the other element and having an aperture adapted to be brought into alinement with the other aperture, and a padlock for locking the same by means of its shackle passed through said apertures, substantially as described.

2. In combination with a faucet constructed to be screwed into a barrel, and a screw having an apertured head, clamp members pivoted upon the faucet and encircling same, the ends of said clamp members being apertured, and a padlock, the shackle of which can be passed through said apertures when the faucet and screw are both screwed into the barrel to prevent the turning of said faucet and screw, substantially as described.

In witness whereof I have hereunto set my hand in the presence of two subscribing witnesses.

GEO. H. KÖRNER.

Witnesses:
   BESSIE GORFINKEL,
   HAZEL RIVERS.